(12) United States Patent
Yang

(10) Patent No.: US 6,452,152 B1
(45) Date of Patent: Sep. 17, 2002

(54) SENSE AMPLIFIER HAVING A PRECISION ANALOG REFERENCE LEVEL FOR USE WITH IMAGE SENSORS

(75) Inventor: David Xiao Dong Yang, Mt. View, CA (US)

(73) Assignee: Pixim, Inc., Mountain View, CA (US)

( * ) Notice: Subject to any disclaimer, the term of this patent is extended or adjusted under 35 U.S.C. 154(b) by 26 days.

(21) Appl. No.: 09/714,350

(22) Filed: Nov. 15, 2000

Related U.S. Application Data

(60) Provisional application No. 60/184,095, filed on Feb. 22, 2000, and provisional application No. 60/184,096, filed on Feb. 22, 2000.

(51) Int. Cl.$^7$ ................................................ H01J 40/14
(52) U.S. Cl. ................................. 250/208.1; 250/214
(58) Field of Search .......................... 250/208.1, 214.1, 250/214 A; 348/307, 308, 312, 302, 311

(56) References Cited

U.S. PATENT DOCUMENTS

| | | | | |
|---|---|---|---|---|
| 5,461,425 A | * | 10/1995 | Fowler et al. | 250/208.1 |
| 5,565,916 A | * | 10/1996 | Katayama et al. | 341/139 |
| 5,801,657 A | * | 9/1998 | Fowler et al. | 341/155 |
| 6,005,488 A | * | 12/1999 | Symanow et al. | 340/825.22 |
| 6,249,240 B1 | * | 6/2001 | Bellaouar | 341/155 |
| 6,295,013 B1 | * | 9/2001 | Barna et al. | 341/138 |

* cited by examiner

*Primary Examiner*—Stephone Allen
*Assistant Examiner*—Bradford Hill
(74) *Attorney, Agent, or Firm*—Carmen Cook; Joe Zheng

(57) ABSTRACT

The presently preferred embodiment of the invention comprises a single ended bit-line from each pixel, small swing bit-line detection, a regenerative sense amplifier, and reference generation using precision analog references.

33 Claims, 9 Drawing Sheets

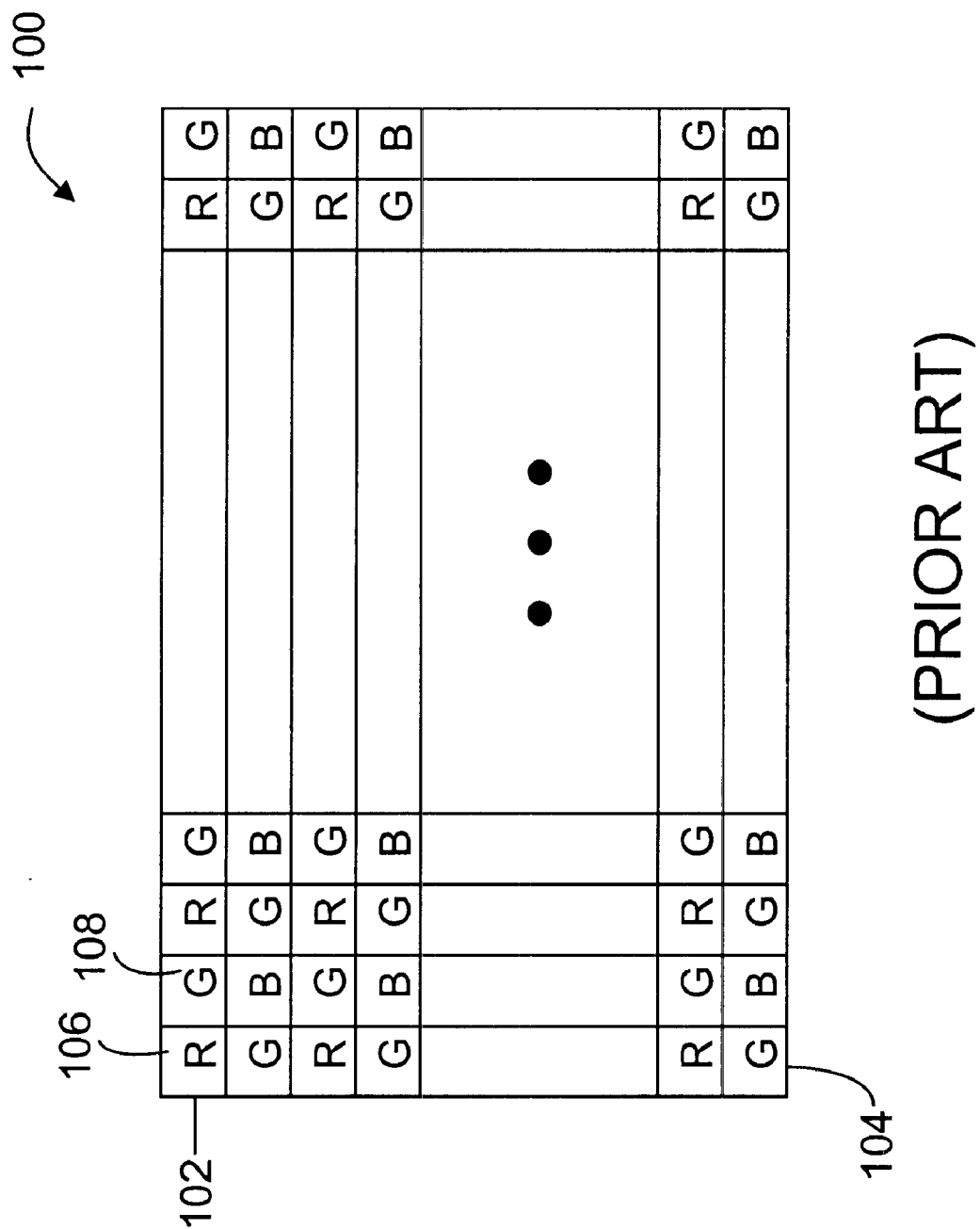

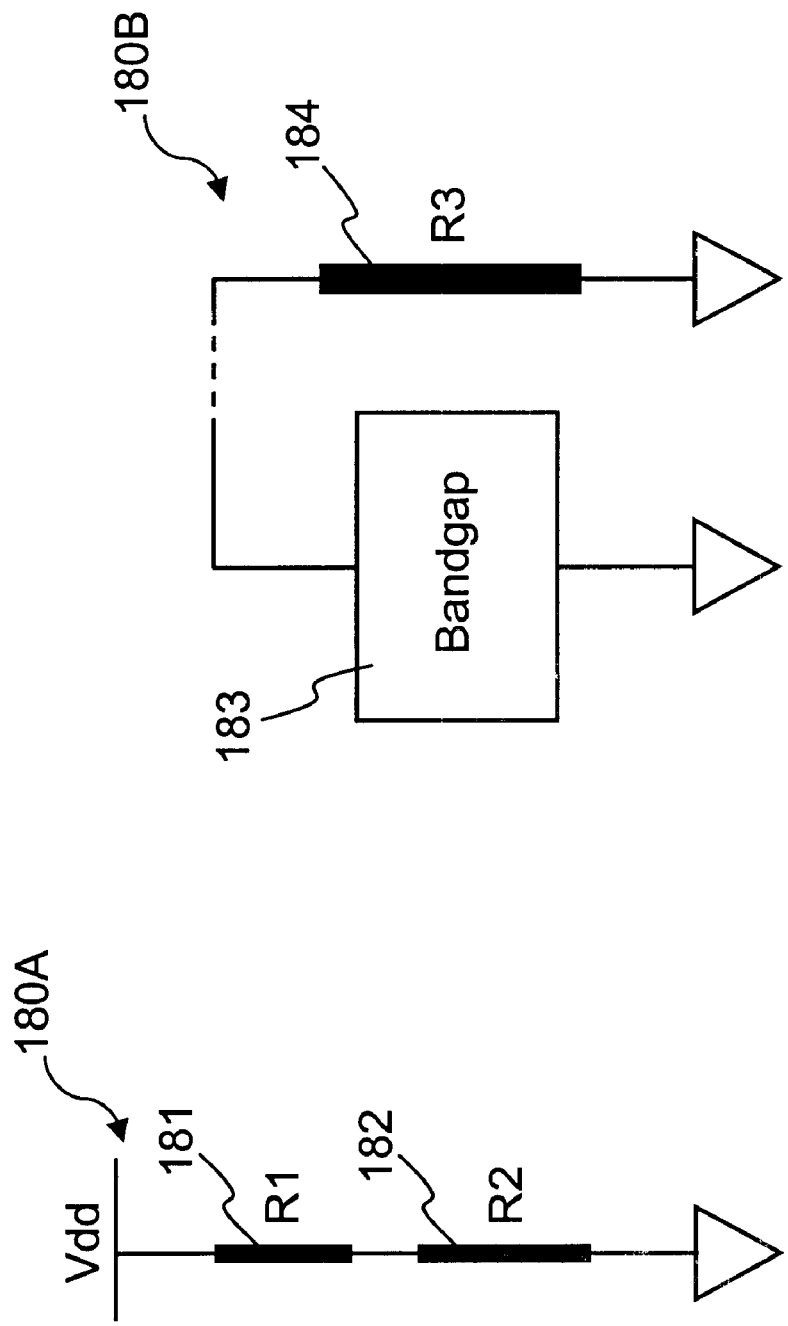
Fig. 8A  Resistive ladder
Fig. 8B  Bandgap based

SENSE AMPLIFIER HAVING A PRECISION ANALOG REFERENCE LEVEL FOR USE WITH IMAGE SENSORS

CROSS-REFERENCE TO RELATED APPLICATIONS

This application is related to U.S. Pat. Nos. 5,461,425 and 5,801,657 and pending U.S. patent application Ser. No. 09/274,202, filed on Mar. 22, 1999, each of which is hereby incorporated by reference. This application claims priority from provisional patent applications Ser. No. 60/184,095 and Ser. No. 60/184,096, both filed Feb. 22, 2000 and from U.S. patent application Ser. Nos. 09/567,786 (filed May 9, 2000) and 09/567,638 (filed May 9, 2000).

BACKGROUND OF THE INVENTION

1. Technical Field

The invention relates to image sensor systems. More particularly, the invention relates to a sense amplifier having a precision analog reference level for use with image sensors.

2. Description of the Related Art

Digital photography is one of the most exciting technologies to have emerged during the twentieth century. With the appropriate hardware and software (and a little knowledge), anyone can put the principles of digital photography to work. Digital cameras, for example, are on the cutting edge of digital photography. Recent product introductions, technological advancements, and price cuts, along with the emergence of email and the World Wide Web, have helped make the digital cameras one of the hottest new category of consumer electronics products.

Digital cameras, however, do not work in the same way as traditional film cameras do. In fact, they are more closely related to computer scanners, copiers, or fax machines. Most digital cameras use an image sensor or photosensitive device, such as charged-coupled device (CCD) or complementary metal-oxide semiconductor (CMOS) to sense a scene. The photosensitive device reacts to light reflected from the scene and can translate the strength of that reaction into a numeric equivalent. By passing light through red, green, and blue filters, for example, the reaction can be gauged for each separate color spectrum. When the readings are combined and evaluated via software, the camera can determine the specific color of each element of the picture. Because the image is actually a collection of numeric data, it can easily be downloaded into a computer and manipulated for more artistic effects.

In many digital imaging applications, it is desirable to integrate analog-to-digital conversion (ADC) with an area image sensor, as described in B. Fowler et al, CMOS Image Sensor with Pixel Level A/D Conversion, U.S. Pat. No. 5,461,425. Such integration helps lower system cost, power consumption and improve system performance. Among the different schemes for integrating the ADC with an area image sensor, pixel level ADC promises to achieve the lowest power, and the simplest, most process portable and scalable design. The ADC approach described in U.S. Pat. No. 5,461,425 is based on first order sigma delta modulation which has the advantage of requiring fairly simple and robust circuits. Further with the digital values directly provided by each of the pixel elements, the readout of the digital values could be of extremely high.

Thus, in the image sensor architecture disclosed in U.S. Pat. No. 5,461,425, each pixel or group of pixels contains an ADC so that the readout from the pixel to the sensor array periphery is fully digital. Typically, the readout circuit is a ROM or a single ended SRAM. Such circuit comprises a pixel inside a sensor array and a pixel output bitline. A transistor serves as a buffer readout transistor, and another transistor serves as a select transistor, which is controlled by a signal typically labeled as WORD.

On the other end of the bitline there is a sense amplifier for detecting the digital output of the pixel. Because there are typically many such sense amplifiers required for a large pixel array, it is desirable that the sense amplifiers be high speed, low noise, and power efficient.

In the image sensors designed in the past (see, for example, ISSCC94), the sense amplifiers are single-ended to save area in the pixel, but the bitline swings rail to rail, i.e. $V_{dd}$ to Gnd (i.e. ground). Such full rail swing generates noise and consumes a considerable amount of power.

It would be advantageous to provide a robust sense amplifier, for example for use with the image sensors, that features high speed, low noise, and power efficiency.

SUMMARY OF THE INVENTION

The invention concerns a robust sense amplifier, for example, for use with the image sensors disclosed in U.S. Pat. No. 5,461,425 or preferably in an improved version thereof that features high speed, low noise, and power efficiency. The presently preferred embodiment of the invention comprises a single ended bit-line from each pixel, small swing bit-line detection, a regenerative sense amplifier, and reference generation using precision analog references. In particular, the invention provides a substantial departure from the state of the art, for example, because the use of precision analog references for reference generation is believed unknown in present day sense amplifiers that typically comprise purely digital elements.

Accordingly one of the objects of the present invention is to provide a sense amplifier having a precision analog reference level to be used in images sensors.

Other objects, benefits and advantages together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 1A is a block diagram that shows a CMOS image sensor or photosensitive chip in which the invention may be practiced;

FIG. 8A is a schematic diagram showing a resistive ladder according to a preferred embodiment of the invention; and FIG. 8B is a block schematic diagram showing a according to an alternate, equally preferred embodiment of the invention.

DETAILED DESCRIPTION OF THE INVENTION

In the following detailed description of the invention, some specific details are set forth to provide a thorough understanding of the presently preferred embodiment of the invention. However, it should be apparent to those skilled in the art that the invention may be practiced in embodiments that do not use the specific details set forth herein. Well known methods, procedures, components, and circuitry have not been described in detail to avoid unnecessarily obscuring the invention. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams, if there are any, representing one or more embodiments of the invention do not inherently indicate any particular order nor imply any limitations in the invention.

In the following discussion, in references to the drawings like numerals refer to like parts throughout the several views. FIG. 1A shows an image sensor or photosensitive chip 100 in which the invention may be practiced. The image sensor 100 may be used in an image capturing device, e.g. a digital camera, for either stationary or video photography, and produces digital image data. The photosensitive chip 100, which is typically fabricated on a substrate such as CMOS, comprises a plurality of photodetectors that are arranged in an array. For color applications, a mosaic of selectively transmissive filters is superimposed in registration with each of the photodetectors so that a first, second, and third selective group of photodetectors are made to sense three different color ranges, for example, the red, green, and blue range of the visible spectrum, respectively. The number of the photodetectors in the photosensitive chip 100 typically determines the resolution of digital images resulting therefrom. The horizontal resolution is a function of the number of photodetectors in a row 102, and the vertical resolution is a function of the number of photodetectors in a column 104.

Figure 1B:
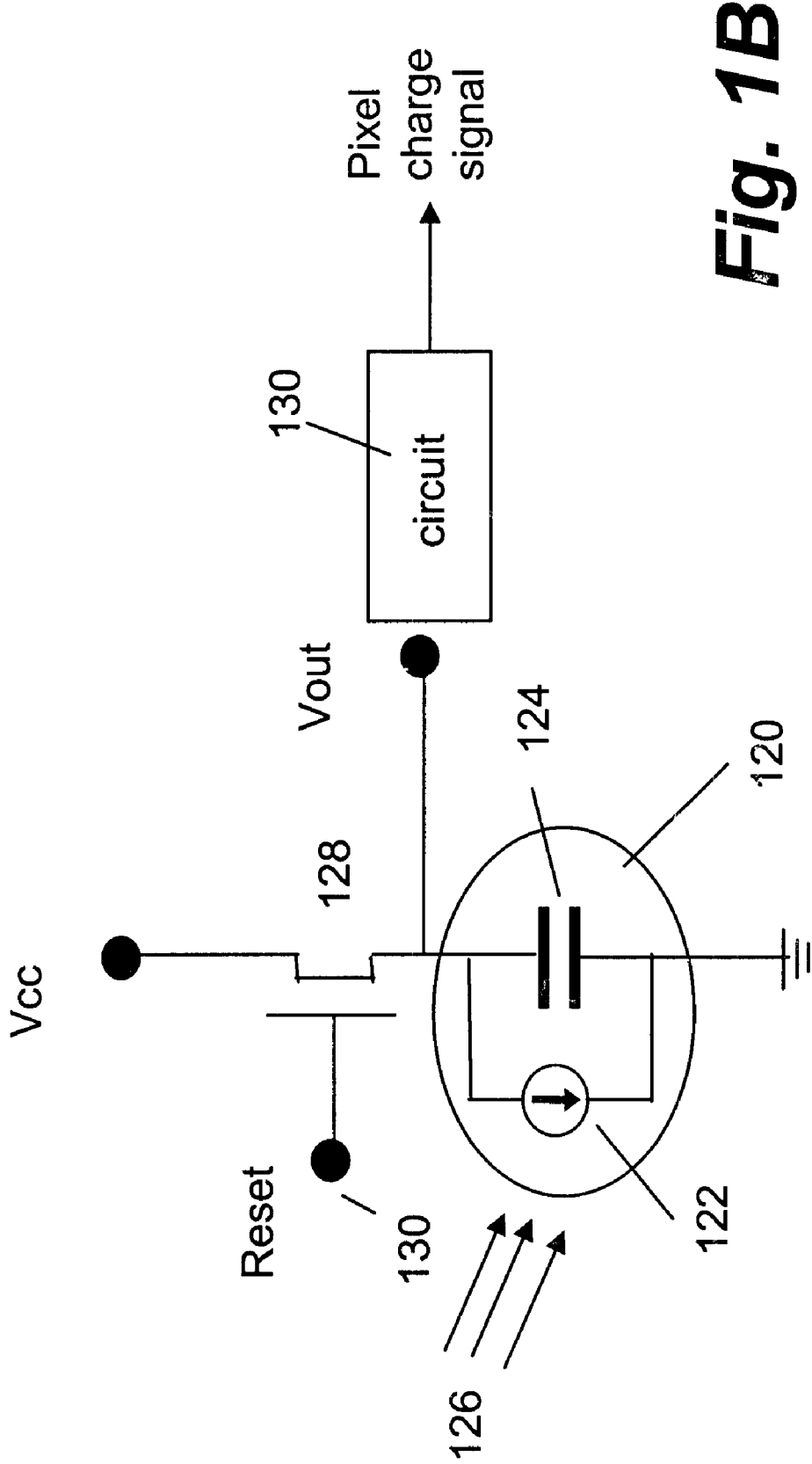
FIG. 1B is a block diagram which shows a photodiode modeled as a current source and a capacitor.

Each of the photodetectors comprises a photosensor that produces an electronic signal when it is exposed to light. Generally, the photosensor is a photodiode or a photogate in a CMOS sensor. FIG. 1B shows a photodiode 120 that is modeled as a current source 122 and a capacitor 124. When a reset signal is applied at a Reset terminal 130, the capacitor 124 is fully charged by and nearly to Vcc through the transistor 128, at which point the photodiode 120 is ready for light integration. It should be noted that the capacitor 124 is actually charged to Vcc-Vt, where Vt is a voltage across the transistor 128. For simplicity, Vt is assumed to be nearly zero.

As soon as the reset signal is dropped, i.e. the voltage level is changed, light integration starts. As more and more incident photons from light 126 strike the surface of the photodiode 120, the current of current source 122 increases. The capacitor 124 starts to discharge through the current source 122. Typically, the photodiode collects more photons for higher photon intensities and, as a result, the resistance of the resistor 122 decreases. Consequently, a faster discharge signal Vout is produced. In other words, the signal from Vout is proportional to the incident photons which strike the photodiode 120. This signal is alternatively referred to herein as an electronic signal or pixel charge signal. Optionally, a circuit 130 may be employed to enhance the electronic signal Vout to a desired level so that the output, i.e. the pixel charge signal, is effectively coupled to following circuitry.

Operation of an image sensor comprises two processes:

The light integration process, as described above; and

The read out process.

Each of these two processes is sustained for a controlled time interval. In the light integration process, each photodetector is initiated to accumulate incident photons of the light and the accumulation is reflected as a pixel charge signal. After the light integration process, the photodetectors start the read out process during which the pixel charge signal in each photodetector is read out via read out circuitry to a data bus or video bus. The interval during which the light integration process proceeds is referred to as exposure control or electronic shuttering, and it controls how much charge is accumulated by each of the photodiodes.

Figure 2:
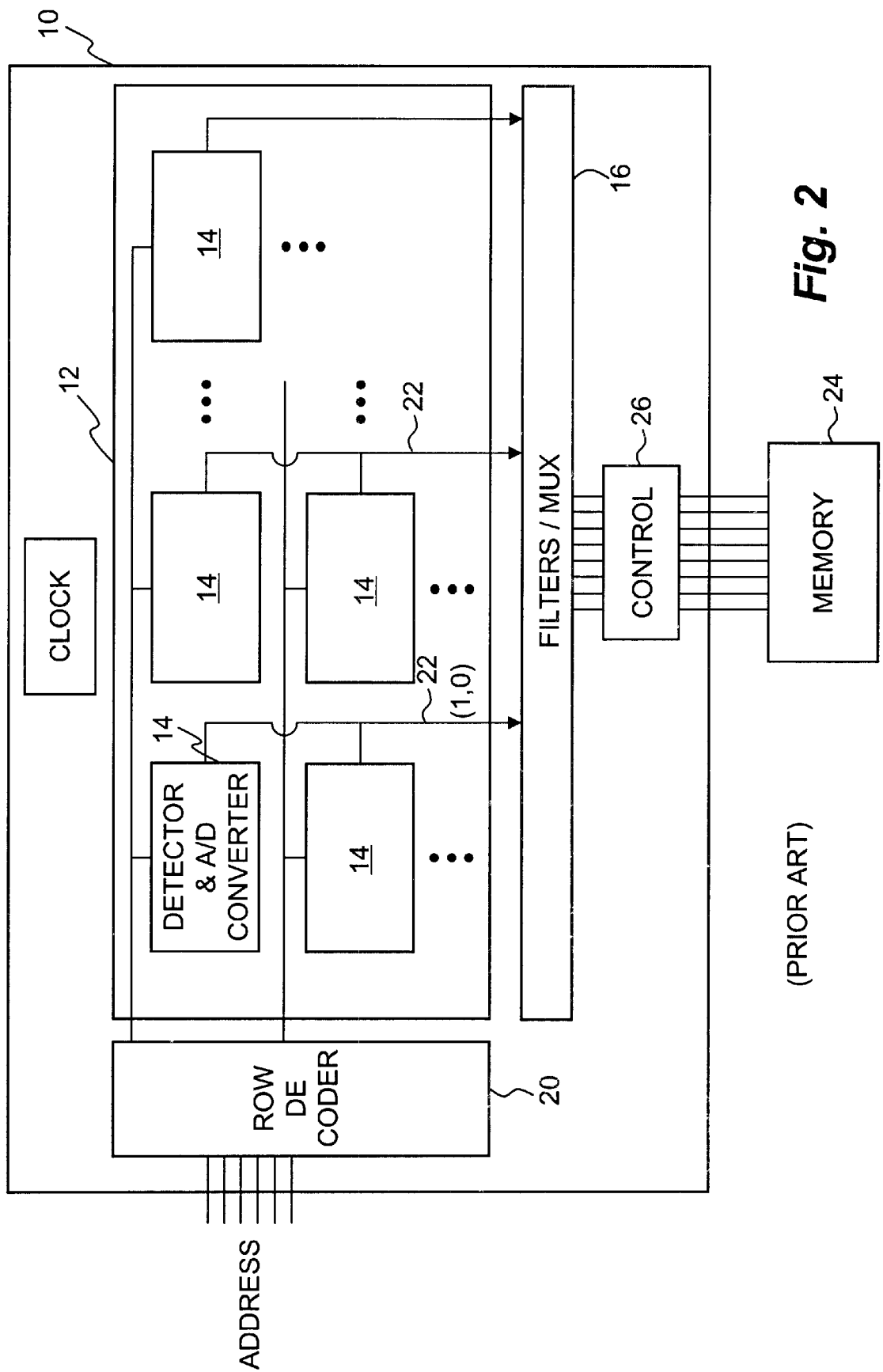
FIG. 2 is a block diagram which shows the architecture of a digital pixel sensor, as described in U.S. Pat. No. 5,461,425.

FIG. 2 duplicates FIG. 1 of U.S. Pat. No. 5,461,425 and shows that each photodetector 14 includes an A/D converter in addition to a photosensor. Each of the photodetectors is referred to as a sensor pixel or a sensor element or digital pixel. This is done to indicate that the photodetector herein includes an analog-to-digital conversion circuit, as opposed to a photodetector which is commonly seen in a conventional image sensor, and which includes a photosensor and produces an analog signal. Further, the pixel element herein is different from a conventional image sensor because it outputs digital signals that can be read out at a much higher speed than an analog signal can be read out in a conventional image sensor. Hence, the resultant image sensor is considered a digital pixel sensor (DPS). The preferred embodiment of the invention is based on such architecture in which a sensor element includes a photosensor and an analog-to-digital conversion circuit.

The image sensor of FIG. 2 is formed on a single integrated circuit chip 10. The image sensor core 12 comprises a two-dimensional array of light detecting elements, each connected to a dedicated A/D converter which outputs a stream of bits representative of the analog output of the light detecting element. The combination of a light detecting element and A/D converter constitutes a single pixel element 14. Each pixel element 14 includes identical circuitry. Digital filters 16 on chip 10 are connected to receive the digital streams from each pixel element 14 and convert each digital stream to an eight-bit byte representative of one of 256 levels of light intensity detected by the respective pixel element 14.

In operation, an image is focused on the image sensor core 12 such that a different portion of the focused image impinges on each pixel element 14. Each light detecting element comprises a phototransistor whose conductivity is related to the intensity of light impinging upon the base of the phototransistor. The analog current through the phototransistor thus corresponds to the intensity of light impinging upon the phototransistor. The analog signals from all phototransistors in the core 12 are simultaneously converted into serial bit streams output from dedicated A/D converters clocked using a common clock driver 18. The serial bit streams, over a period of time, i.e. over a frame period, can then be processed by filters 16 (on-chip or off-chip) to derive a signal representative of the intensity of light impinging on the phototransistor.

After each clock cycle, one bit is latched at an output of each A/D converter within each pixel element 14. To now transfer each bit generated by the pixel elements 14 to the filters 16 after each clock cycle, each of the rows of pixel elements 14 are addressed in sequence, using row decoder 20, until all rows of pixel elements 14 have been addressed. Upon addressing each row, the one-bit output of each pixel element 14 in the addressed row is coupled to a corresponding bit line 22. The filters 16 process the bit stream from each pixel element 14 to generate an eight-bit value per pixel element 14 corresponding to the average intensity of light impinging on the respective pixel element 14 for that frame period. These eight-bit values may then be output from the chip 10, using a suitable multiplexer or shift register, and temporarily stored in a bit-mapped memory 24. The memory 24 may then act as a frame buffer, where the light intensity values in memory 24 are sequentially addressed for controlling the light output of corresponding pixels in a monitor.

In a particular embodiment of FIG. 2, it is assumed that sixty-four separate filters 16 are used for converting the bit streams output on sixty-four bit lines 22 to eight-bit values. A multiplexer at the output of the core 12 may reduce the number of required filters to, for example, sixteen. The preferred interaction of filters 16 with memory 24 is as follows. Immediately after a row of pixel elements 14 has been addressed, a control circuit 26, using the address generated by row decoder 20, fetches a previous (or interim) eight-bit value stored in memory 24 for each pixel element 14 in the addressed row and loads this previous value into the proper one of the 64 filters 16 about to receive a new bit from that pixel element 14. Conventional memory addressing techniques and circuitry may be used for this process. The single bit output of the respective A/D converters in the addressed pixel elements 14 is then applied to a respective one of the sixty-four filters 16 containing the previous eight-bit value for that pixel element 14. Each filter 16 then updates the previous eight-bit value with the new single bit of information to generate a new interim value. The now updated eight-bit value generated by each filter 16 is then transferred back into memory 24, under control of the control circuit 26.

Figure 3:
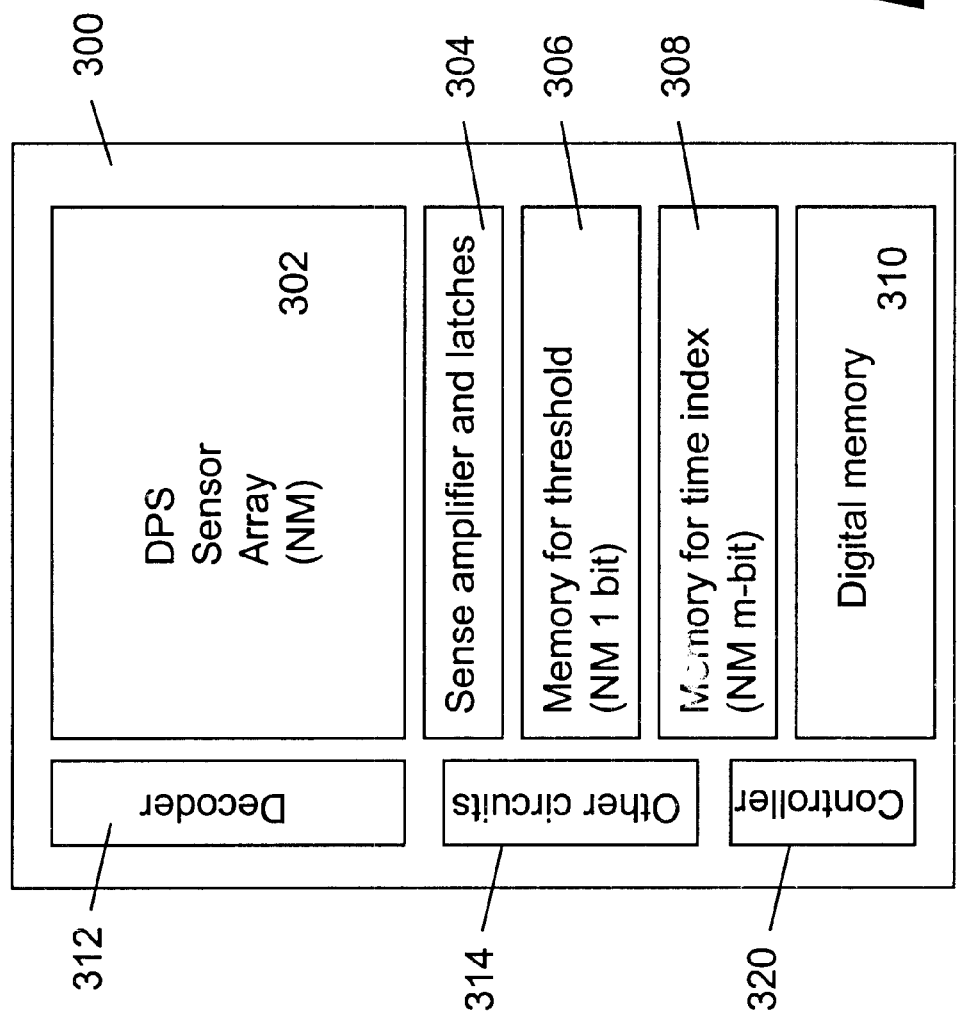
FIG. 3 is a block diagram which shows an image sensor that includes a threshold memory, a time index memory, a separate data memory, and a controller, where each of the memories and the digital pixel sensor are integrated into the same sensor.

Referring to FIG. 3, there is shown an image sensor 300 based on the digital pixel sensor according to one embodiment of the invention. The digital pixel sensor 302 may be implemented according to U.S. Pat. No. 5,461,425 or U.S. Pat. No. 5,801,657, and outputs digital signals representing one or more images of a scene. A sense amplifier and latches 304 are coupled to the digital pixel sensor 302 to facilitate read out of the digital signals from the digital pixel sensor 302. An image sensor 300 in accordance with the invention also includes a memory 306 (referred to herein as a threshold memory) for storing threshold values, a memory 308 (referred to herein as a time index memory) for storing time index values, and a digital or data memory 310 that is large enough to accommodate a frame of image data from sensor 302.

According to one embodiment of the invention, it is assumed that the sensor 302 is of N by M pixels and has k-bits. Thus, the size of the threshold memory 306 is of N by M bits, and the size of the time index memory 308 is of N by M by m bits, where m is the time resolution. The presently preferred pixel resolution of sensor 302 is 1000 by 1000 in 10 bits. Thus, the threshold memory 306 is a one-megabit memory, the time index memory 308 is a two-megabit memory when the time index is set to be T, 2T, 4T and 8T (i.e. two-bit resolution), and the digital memory 306 preferably has a size of at least 1.2 megabytes.

The invention herein concerns a robust sense amplifier, for example for use with DPS image sensors (although not limited to such sensors, nor limited in any way to such sensors as are discussed herein in connection with FIGS. 1–3 which, for purposes of the invention herein and by way of illustration and example of a use of the presently preferred embodiment of the invention only, comprise one prior art device with which the invention may be practiced), that features high speed, low noise, and power efficiency.

Figure 4:
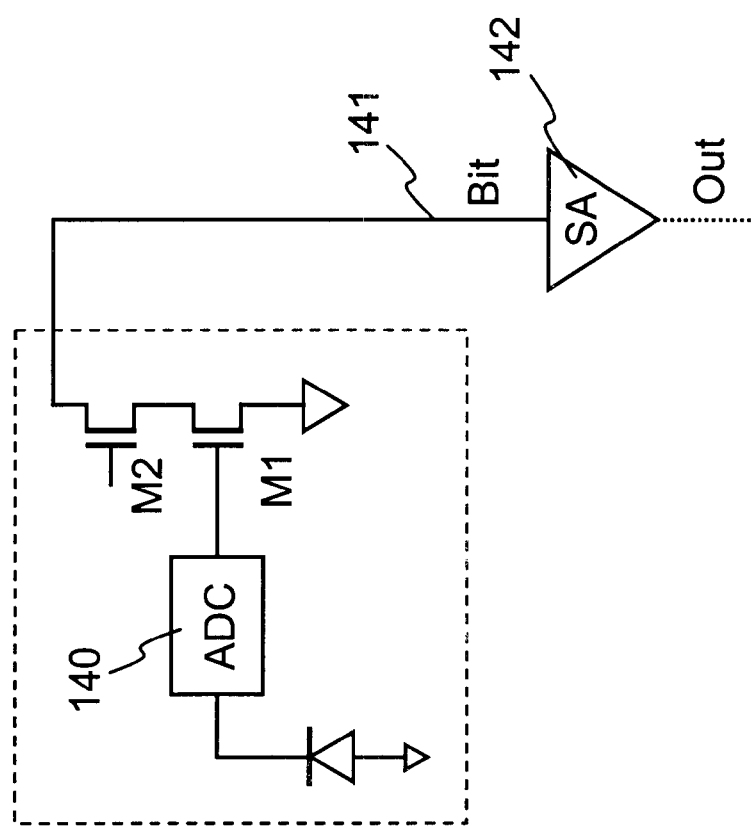
FIG. 4 is a block schematic diagram showing a typical sense amplifier arrangement.

FIG. 4 is a block schematic diagram showing a typical sense amplifier arrangement. In CMOS digital pixel sensor (DPS) image sensors, each pixel or group of pixels contains an ADC 140 so that the readout from the pixel to the sensor array periphery is fully digital. Typically, the readout circuit in a pixel is similar to that in a ROM or a single ended SRAM. Such circuit comprises a pixel inside a sensor array (not shown) and a pixel output bitline 141. A transistor M1 serves as a buffer readout transistor, and a transistor M2 serves as a select transistor, which is controlled by a signal typically labeled as WORD.

On the other end of the bitline there is a sense amplifier 142 for detecting the digital output of the pixel. Because there are typically many such sense amplifiers required for a large pixel array, it is desirable that the sense amplifiers be high speed, low noise, and power efficient.

The presently preferred embodiment of the invention comprises a single ended bit-line from each pixel, small swing bit-line detection, a regenerative sense amplifier, and reference generation using precision analog references. In particular, the invention provides a substantial departure from the state of the art, for example, because the use of precision analog references for reference generation is unknown in present day sense amplifiers which typically comprise purely digital elements.

Another key feature of the invention is the reduction and minimization of the number of transistors and metal lines going through each pixel. This allows the pixel area to be in turn minimized. Although in ISSCC94 a rail-to-rail swing bitline is used, the presently preferred embodiment of the invention uses a small swing, e.g. 150 mV, bitline having a single-ended readout within the pixel itself. To make a sense amplifier work reliably in the configuration, the invention provides a pseudo-differential to minimize the impact of system noise, such as ground bounce and coupling.

Figure 5:
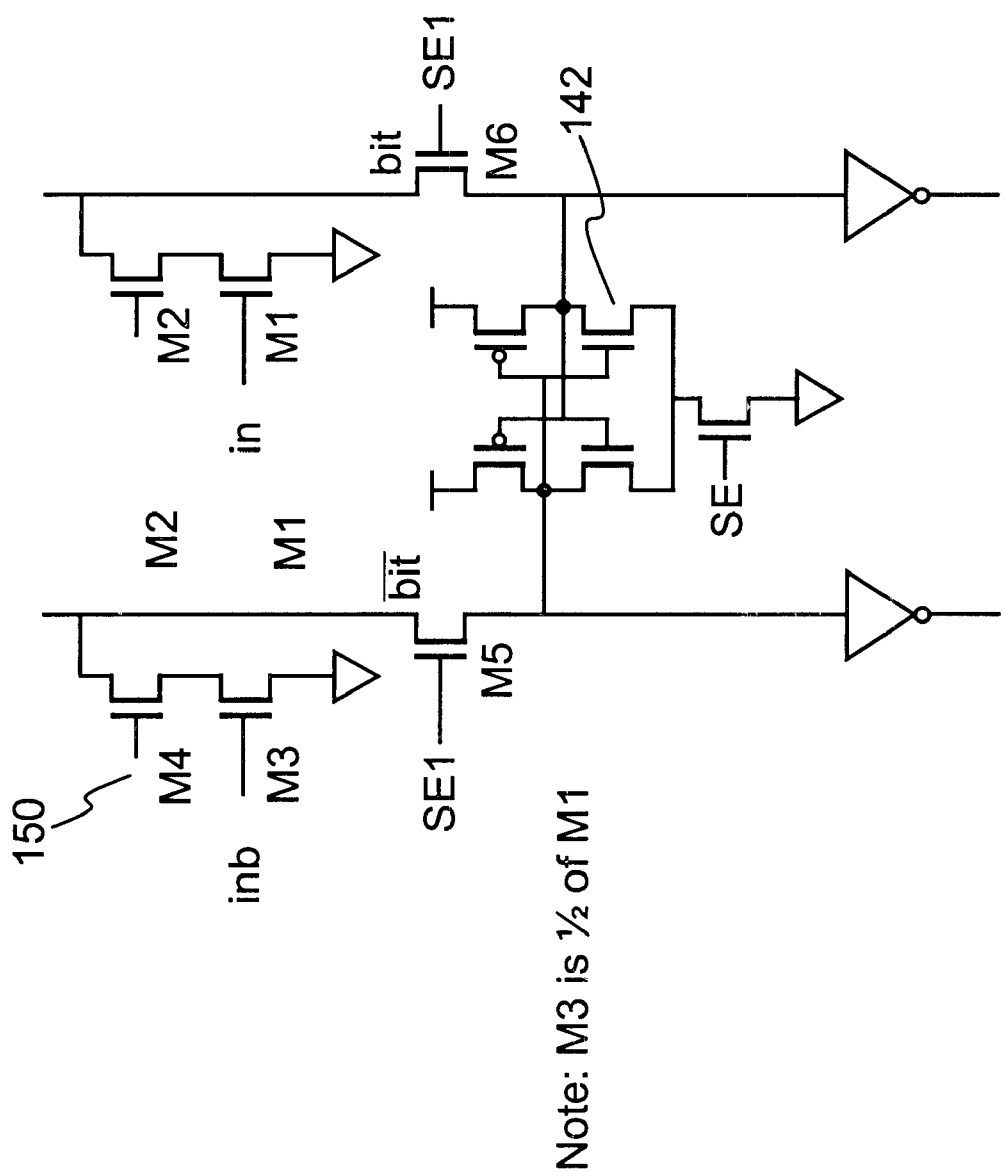
FIG. 5 is a block schematic diagram which shows a sense amplifier having a dummy reference cell according to one embodiment of the invention.

One approach known in the art uses a sense amplifier having a dummy reference cell, as shown in FIG. 5. In this circuit, the sense amplifier consists of a plurality of cross coupled inverters that are each controlled by a select line SE.

The circuit in FIG. 5 omits the well known precharge circuit because this aspect of the invention is well understood by those skilled in the art of sense amplifier design.

The dummy reference cell 150 has a driving capability of only one half of that of a regular cell. In the circuit shown on FIG. 5, the input inb is set to one. This essentially creates a pseudo-differential input to the sense amplifier 142. Thus, if the input in is one, then the source of transistor M6 "bit" discharges twice as fast as the source of SE1 "$\overline{\text{bit}}$." When the difference between "bit" and "$\overline{\text{bit}}$" reaches a certain level, e.g. 70 mV, the sense amplifier can be fired to enlarge the difference between the two bit lines. In such case, the access transistors M5, M6 are turned off before the sense amplifier is fired to reduce bit line swing. If the input in=0, then "bit" does not change, but "$\overline{bit}$" discharges so that eventually the difference between "bit" and "$\overline{bit}$" reaches a certain level. At this point, the sense amplifier is fired to enlarge this difference.

The circuit of FIG. 5 has some limitations. For example, for the pseudo-differential circuit to work robustly, the dummy cell must be laid out close to the regular cell. This is very difficult to do because a dummy cell is located at the edge of a sensor array and thus is far from pixels that are situated near the center of the sensor array. Due to different lengths in the readout path, it is difficult to match the regular cell and its dummy cell.

Figure 6:
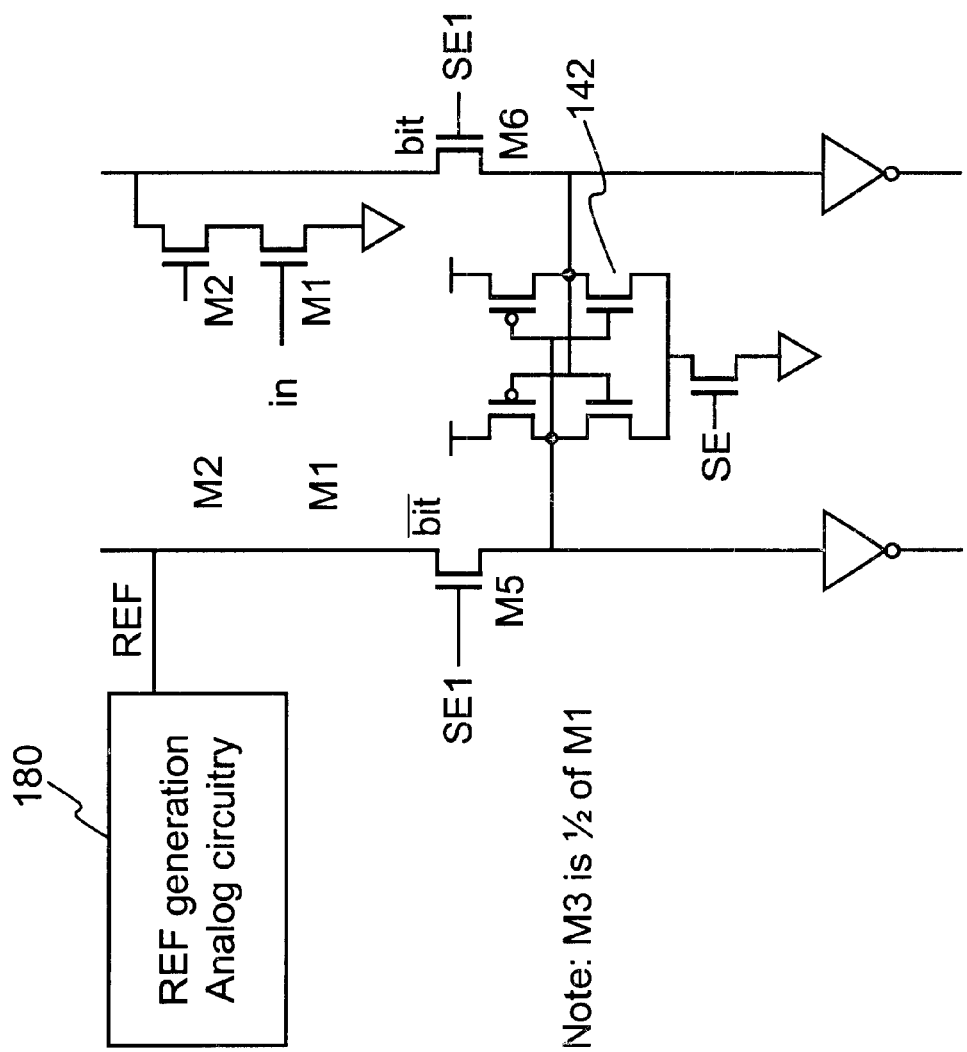
FIG. 6 is a block schematic diagram which shows a sense amplifier that includes a mechanism for generating a reference voltage according to a preferred embodiment of the invention.

The present preferred embodiment of the invention solves this problem by generating a reference voltage to compare with the voltage on the bitline instead of generating a "$\overline{bit}$" with a dummy pixel. See FIG. 6. In this embodiment of the invention, as long as the reference voltage REF can be generated accurately by the reference voltage generator 180, and tracks the environment it is possible to generate the desired sense amplifiers. For example, the reference voltage REF can be set at 0.9 Vdd (or Vdd−0.1). If the input in=1, then during reading the bit line eventually goes below REF of Vdd−0.1, e.g. down to Vdd−0.2, i.e. a 200 mV swing, and in such case firing of the sense amplifier generates the correct output.

Figure 7:
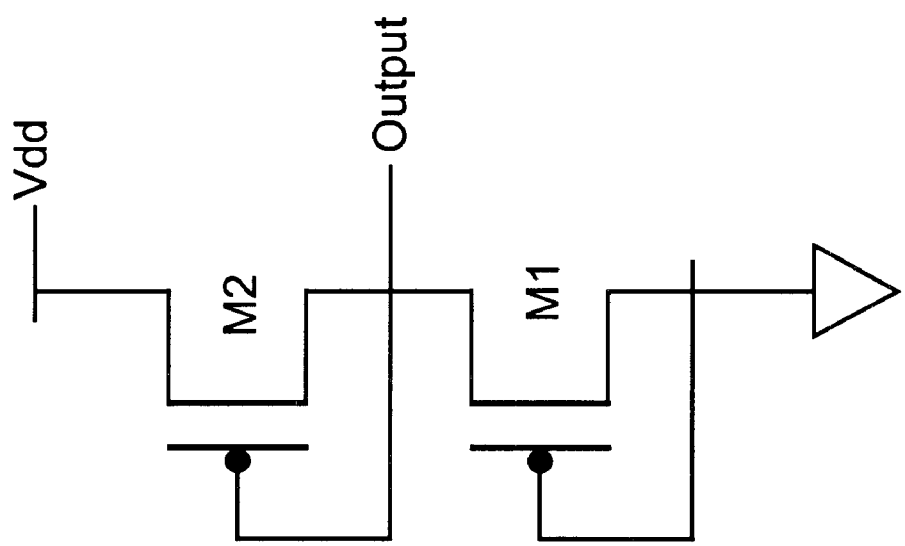
FIG. 7 is a schematic diagram of a digital circuit in which ratioed MOSFETs are stacked in series to create a reference voltage.

It is difficult to generate the precise analog reference REF. Most memory sense amplifier designs attempt to use a digital circuit in which ratioed MOSFETs are stacked in series to create the right voltage (see FIG. 7), where the nominal output is about 0.5 Vdd. However, due to process imperfections and Vt mismatch, the generated output is not precise.

The preferred embodiment of the invention uses analog circuits to solve the REF generation problem. This approach is particularly well suited in mixed signal chips, where analog circuits are already available for use.

The invention as presently practiced comprises two different techniques by which REF may be generated (see FIGS. 8A and 8B).

One approach uses a resistive ladder 180A (FIG. 8A), for example, in which two or more resistors 181, 182 are stacked in series between the two power rails, e.g. Vdd and Gnd. The resistors can be made of poly (i.e., polysilicon) or may be well devices (well resistors have very good quality when produced using a deep sub-micron process) because only the ratio matters. The fabrication of such devices is well known to those skilled in the art. Thus, to ghenerate 0.9 Vdd, it is only necessary to ratio two resistors with a ratio of 1:9.

A second approach 180B (FIG. 8B) is to use a bandgap 183 to generate very stable analog voltages. In a semiconductor material, the bandgap is the minimum energy necessary for an electron to transfer from the valence band into the conduction band, where it moves more freely. In many mixed signal circuits, bandgap generation is performed already for other purposes. In such cases, the bandgap circuitry is readily applied to the sense amplifiers. A bandgap circuit generates a DC voltage or current that is independent of the supply and process and has a well-defined behavior with temperature. A bandgap circuit generates a DC voltage e.g. 300 mv when referred from vdd, i.e. it generates a stable vdd−0.3v. When Vdd bounces, the analog signal bounces with it. When the sensor array is large, it may be preferable to route current through the circuit and generate the appropriate voltages locally close to the sense amplifiers.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. An image sensor, comprising:
    a sensor array comprising a plurality of pixels arranged in rows and columns, wherein said sensor array outputs signals on associated bitlines for said pixels, which signals from said pixels collectively represent one or more images of a scene, wherein said sensor array is fabricated in an integrated circuit; and
    an individual sense amplifier associated with each bitline for sensing signals from said pixels, said sense amplifier comprising a reference voltage generator for generating an analog reference voltage to compare with a voltage from said pixels on said bitline, wherein said sense amplifier is fabricated in said integrated circuit.

2. The image sensor of claim 1, wherein said reference voltage generator comprises a resistive ladder.

3. The image sensor of claim 2, wherein said resistive ladder comprises two or more resistors stacked in series between two power rails of said integrated circuit.

4. The image sensor of claim 3, wherein said resistors are made of either of polysilicon or are well devices.

5. The image sensor of claim 2, wherein said resistive ladder generates an analog reference voltage as a ratio of two resistors.

6. The image sensor of claim 1, wherein said reference voltage generator comprises a bandgap.

7. The image sensor of claim 1, wherein said analog reference voltage is set at k times the power supply voltage Vdd of said integrated circuit such that said bitline associated with each pixel has a small voltage swing.

8. The image sensor of claim 7, wherein k is 0.9.

9. The image sensor of claim 7, wherein said bitline has a voltage swing of 20 mV or less.

10. In an image sensor, comprising a sensor array comprising a plurality of pixels arranged in rows and columns, wherein said sensor array outputs signals on associated bitlines for said pixels, which signals from said pixels collectively represent one or more images of a scene, wherein said sensor array is fabricated in an integrated circuit; and an individual sense amplifier associated with each bitline for sensing signals from said pixels, the improvement comprising:
    said sense amplifier comprising a reference voltage generator for generating an analog reference voltage to compare with a voltage from said pixels on said bitline, wherein said sense amplifier is fabricated in said integrated circuit.

11. The image sensor of claim 10, wherein said reference voltage generator comprises a resistive ladder.

12. The image sensor of claim 11, wherein said resistive ladder comprises two or more resistors stacked in series between two power rails of said integrated circuit.

13. The image sensor of claim 12, wherein said resistors are made of either of polysilicon or are well devices.

14. The image sensor of claim 11, wherein said resistive ladder generates an analog reference voltages a ratio of two resistors.

15. The image sensor of claim 10, wherein said reference voltage generator comprises a bandgap.

16. The image sensor of claim 10, wherein said analog reference voltage is set at k times the power supply voltage Vdd of said integrated circuit such that said bitline associated with each pixel has a small voltage swing.

17. The image sensor of claim 16, wherein said bitline has a voltage swing of 200 mV or less.

18. A sense amplifier associated with each bitline of an image sensor for sensing signals from pixels in said image sensor, comprising:

a reference voltage generator for generating an analog reference voltage to compare with a voltage from said pixels on said bitline;

wherein said voltage generator comprises a resistive ladder.

19. The sense amplifier of claim 18, wherein said resistive ladder comprises two or more resistors stacked in series between two power rails of said integrated circuit.

20. The sense amplifier of claim 19, wherein said resistors are made of either of polysilicon or are well devices.

21. The sense amplifier of claim 18, wherein said resistive ladder generates an analog reference voltage as a ratio of two resistors.

22. The sense amplifier of claim 18, wherein said analog reference voltage is set at k times the power supply voltage Vdd of said image sensor such that said bitline associated with each pixel has a small voltage swing.

23. The sense amplifier of claim 22, wherein k is 0.9.

24. The image sensor of claim 22, wherein said bitline has a voltage swing of 200 mV or less.

25. A sense amplifier associated with each bitline of an image sensor for sensing signals from pixels in said image sensor, comprising:

a reference voltage generator for generating an analog reference voltage to compare with a voltage from said pixels on said bitline;

wherein said voltage generator comprises a bandgap.

26. The sense amplifier of claim 25, wherein said analog reference voltage is set at k times the power supply voltage Vdd of said image sensor such that said bitline associated with each pixel has a voltage swing of 200 mV or less.

27. A method for sensing a pixel of an image sensor array comprising a plurality of pixels arranged in rows and columns, wherein said sensor array outputs signals on associated bitlines for said pixels, which signals from said pixels collectively represent one or more images of a scene, wherein said sensor array is fabricated in an integrated circuit, the method comprising the steps of:

providing an individual sense amplifier associated with each bitline for sensing signals from said pixels; and providing in each said sense amplifier a reference voltage generator for generating an analog reference voltage to compare with a voltage from said pixels on said bitline, wherein said sense amplifier is fabricated in said integrated circuit.

28. The method of claim 27, wherein said reference voltage generator comprises a resistive ladder.

29. The method of claim 28, wherein said resistive ladder comprises two or more resistors stacked in series between two power rails of said integrated circuit.

30. The method of claim 29, wherein said resistors are made of either of polysilicon or are well devices.

31. The method of claim 28, wherein said resistive ladder generates an analog reference voltage as a ratio of two resistors.

32. The method of claim 27, wherein said reference voltage generator comprises a bandgap.

33. The method of claim 27, wherein said analog reference voltage is set at k times the power supply voltage Vdd of said integrated circuit such that said bitline associated with each pixel has a voltage swing of 200 mV or less.

* * * * *